R. J. FLEMING.
MANUFACTURE OF BIFOCAL LENSES AND APPARATUS THEREFOR.
APPLICATION FILED JUNE 13, 1914.

1,305,085. Patented May 27, 1919.

Witnesses.

Inventor.
R. J. Fleming

UNITED STATES PATENT OFFICE.

ROBERT JAMES FLEMING, OF LONDON, ENGLAND.

MANUFACTURE OF BIFOCAL LENSES AND APPARATUS THEREFOR.

1,305,085. Specification of Letters Patent. Patented May 27, 1919.

Application filed June 13, 1914. Serial No. 844,883.

*To all whom it may concern:*

Be it known that I, ROBERT JAMES FLEMING, a subject of the King of Great Britain, residing at 136-142 Clerkenwell road, London, England, have invented new and useful Improvements in the Manufacture of Bifocal Lenses and Apparatus Therefor, of which the following is a specification.

My invention relates to a method of and apparatus for the manufacture of bifocal lenses.

According to the invention the lower field is ground upon a lens by means of a flat or curved grinding disk, which is preferably circular in shape and is caused to sweep around in a circular path and at the same time to rotate upon its own axis by means of a loose eccentric connection with a rotating spindle.

In a suitable arrangement for carrying out the invention I provide a spindle having an eccentric pin upon its lower end, the said eccentric pin engaging in a central hole or depression in the grinding disk. The rotation of the spindle not only causes the grinding disk to move in a circular path around the axis of the spindle but also causes it to rotate upon the eccentric pin as a center, the result being that the whole of the field is ground and smoothed and polished in a most effective manner.

In some cases the movement above described may be combined with a lateral or reciprocating or swinging or oscillating movement of the lens being ground so as to produce an oval field. Also if desired, the lower field may first be roughly ground by means of a circular grinding tool, the said field being subsequently finished and polished by the method above described.

It will be understood that suitable means are provided for applying the grinding disk to the glass with the necessary pressure and that the invention is applicable to the production of bifocal lenses of plane or toric form.

In the accompanying drawing:—

Figs. 3 to 5 are drawn to a larger scale than Figs. 1, 2, 6, and 7.

$a$ represents the frame or standard of the machine, and $b$ is the spindle which is mounted in the bearings $c$, $c$ of the frame $a$, in which bearings it is designed to be rotated by means of the pulley $d$ from any suitable source of power, not illustrated.

$e$ is the eccentric pin which is fitted at the lower end of the spindle $b$ and $f$ is the grinding disk having a central hole or depression $g$ with which the lower pointed end of the eccentric pin $e$ is designed loosely to engage. $h$ is the table upon which the lens A to be ground is secured by cement or pitch in the ordinary way, the said table $h$ being carried by the shank $i$ held in a bracket $j$ of the frame $a$ in which it can be clamped by means of the set-screw $k$ in any position to which it may be adjusted.

$l$ is a T-shaped lever one end of the horizontal bar of which is pivoted at $m$ to the frame $a$, and the other end at $n$ to a sleeve $n^1$ loosely mounted in the spindle $b$ between the pulley $d$ and the collar $b^1$ secured to the spindle $b$. The lower end of the said T-shaped lever is connected to one end of a spiral spring $o$, the other end of which is attached to an adjusting screw $p$. The function of this spring is, as will be obvious, to cause the grinding tool $f$ to be applied to the surfaces of the glass A with the requisite pressure through the medium of the T-shaped lever $l$.

Figure 4:
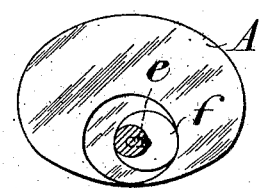
Fig. 4 is a horizontal section on the line 4—4, Fig. 3.

The apparatus operates as follows, that is to say, assuming that the lens A to be ground is cemented to the table $h$ and that the grinding disk $f$, the grinding surface of which has a curvature which corresponds to that to be produced upon the lower field of the lens, is placed in position thereon the lever $l$ is released so as to permit the eccentric pin $e$ to enter the central hole $g$ in the said grinding disk $f$ and to press the latter, under the action of the spiral spring $o$, or by hand pressure, with the requisite force against the surface of the lens A to be ground. The spindle $b$ is then set in rotation, thus causing the grinding disk $f$ to describe a circle around the axis of the said spindle $b$ and also simultaneously to rotate around the eccentric pin *g* as a center, as shown in Fig. 4, the result being that the field is ground to the curvature desired and of a circular shape.

Figure 5:
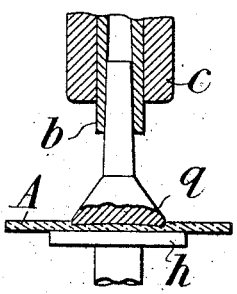
Fig. 5 is a view similar to Fig. 3, but showing the employment of the rough grinding tool.

As stated the circular lower field may, if desired, be first roughly ground, for which purpose the circular grinding tool *q*, Fig. 5, is made use of, the field so ground being subsequently finished and polished by means of the eccentric disk *f* above described.

Figure 1:
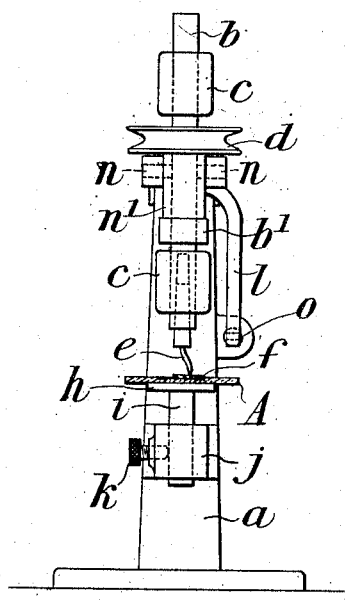
Figure 1 is a front view of a machine for manufacturing bifocal lenses according to the invention.
Figure 2:
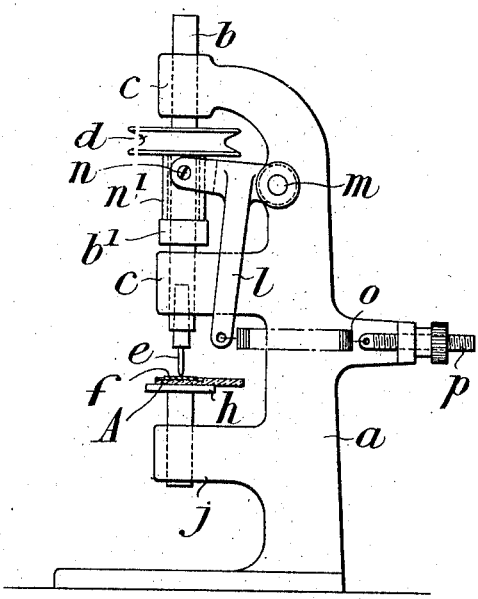
Fig. 2 is a side view thereof.
Figure 3:
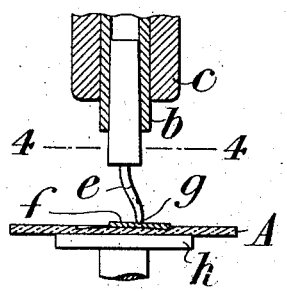
Fig. 3 is a sectional elevation of the grinding spindle, disk and lens being ground.
Figure 7:
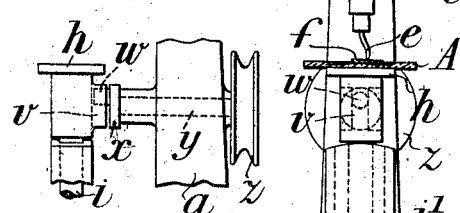
Fig. 7 is a side view of a part of Fig. 6.
Figure 6:
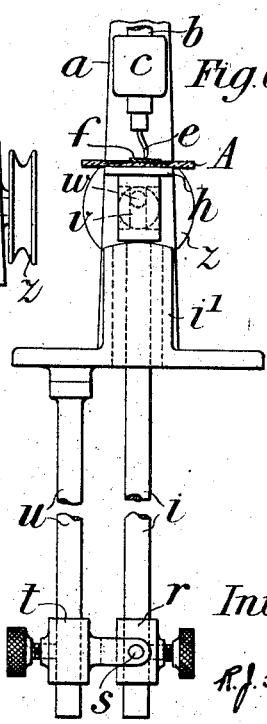
Fig. 6 is a front view of a modified form of machine for producing an oval or elongated lower field.

Figs. 6 and 7 illustrate a modified construction of machine which is designed to produce an elongated or oval lower field for which purpose a lateral or oscillating motion is given to the lens A. The shank *i* of the lens table *h* is adjustably mounted at its lower end in a socket *r* which is mounted on lateral pivots or trunnions *s* in a sleeve *t* adjustably carried upon a fixed rod *u* of the frame. The table shank *i* works in a guide *i¹* on the frame *a* and its upper end is provided with a vertical slot *v* with which engages a crank pin *w* upon a crank disk *x* carried by a spindle *y* mounted in a bearing in the frame *a* and designed to be rotated by the pulley *z*.

As will be obvious this form of the machine operates as follows, that is to say, assuming that the lens A be in position and the machine started, the grinding disk *f* is caused to rotate on its own axis and to swing in a circle around the spindle *b* as above described and at the same time an oscillating motion is imparted to the lens A by the crank pin *w* so that the actual shape of the field which is produced upon the lens A is of an elongated nature. It will be understood that the distance between the surface of the lens being ground and the pivot *s* must be adjusted so that it equals the radius of curvature to be given to the field. It will also be understood that the surface ground will be convex. Where a concave lower field is required the lens holder is arranged to have a corresponding motion imparted to it, for which purpose it may, for example, be suspended from a pivot situated at the proper distance above the lens.

Claims:

1. A machine for grinding the lower field of a bifocal lens comprising a rotatable spindle, a pin mounted eccentrically upon said spindle, and a lens-holding member having lateral movement at right-angles to the axis of the rotatable spindle.

2. In a machine for grinding the lower field of a bifocal lens, the combination of a rotatable spindle, an eccentric pin projecting from said spindle, a table mounted for movement transversely with respect to the axis of the spindle, a grinding member, a lens-holding member, one of the last-named members being provided with a depression in which the end of the said eccentric pin loosely bears, the other one of the last-named members being connected fixedly with the table, and means for operating the spindle and table simultaneously.

3. In a machine for grinding the lower field of a bifocal lens, the combination of a rotatable spindle, an eccentric pin projecting from said spindle, an oscillating table mounted with its pivotal axis intersecting the axis of the spindle, a grinding member, a lens-holding member, one of the last-named members being provided with a depression in which the end of the said eccentric pin loosely bears, the other one of the last-named members being connected fixedly with the table, and means for operating the spindle and the table simultaneously.

4. A machine for grinding the lower field of a bifocal lens including a rotatable spindle, an eccentric pin projecting from said spindle, an oscillating table mounted with its pivotal axis intersecting the axis of the spindle, a guiding means for the table, a crank element connected with the table for oscillating the same, a grinding member, a lens holding member, one of the last named members being provided with a depression in which the end of the eccentric pin loosely bears and the other one of the last mentioned members being connected fixedly with the table, and means for operating the spindle simultaneously with the table.

5. A machine for grinding the lower field of bifocal lens including a frame, a guide carried by the frame and having a depending vertical rod, a sleeve adjustably mounted on the rod, a socket pivotally connected with the sleeve and carried by the same, an oscillating table having a shank operating in the guide and adjustably mounted in the socket, a rotatable spindle, an eccentric pin projecting from the spindle, a grinding member, a lens holding member, one of the last mentioned members being provided with a depression in which the end of the said eccentric pin loosely bears and the other one of the last mentioned members being connected fixedly with the table, and a crank element connected with and actuating the table in its oscillating movement.

ROBERT JAMES FLEMING.

Witnesses:
JOHN E. BONSFIELD,
C. G. RIDFIN.